Sept. 29, 1959   J. F. ZISKAL   2,906,361
MANUAL AND HYDRAULIC STEERING APPARATUS FOR VEHICLES
Filed Jan. 18, 1957   2 Sheets-Sheet 1
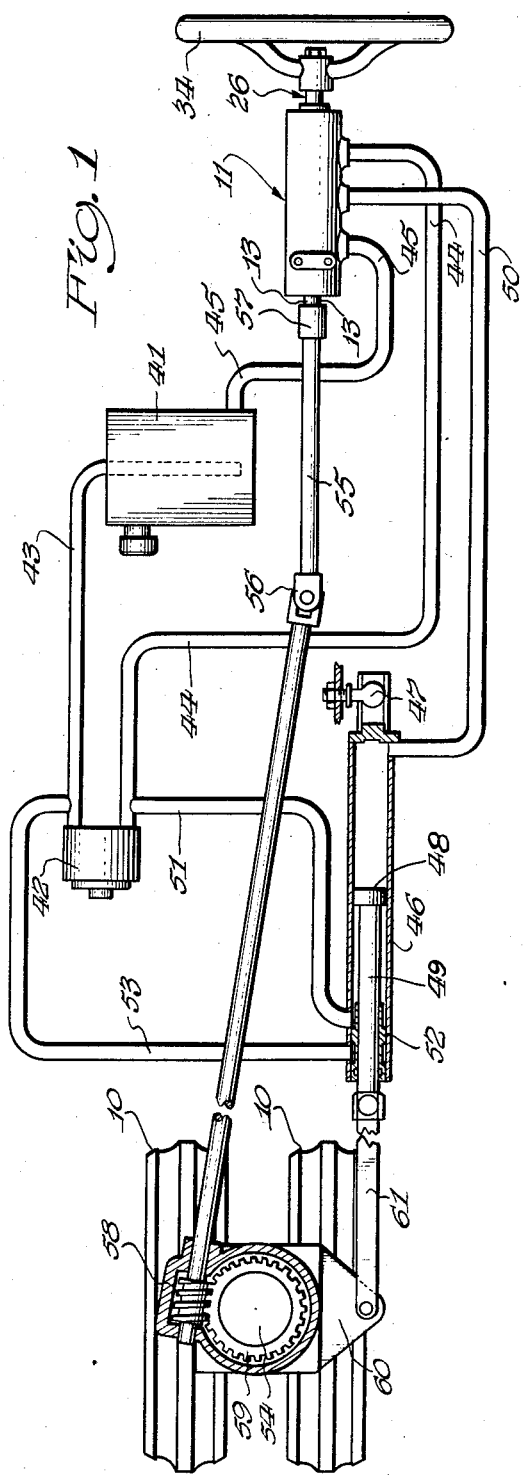
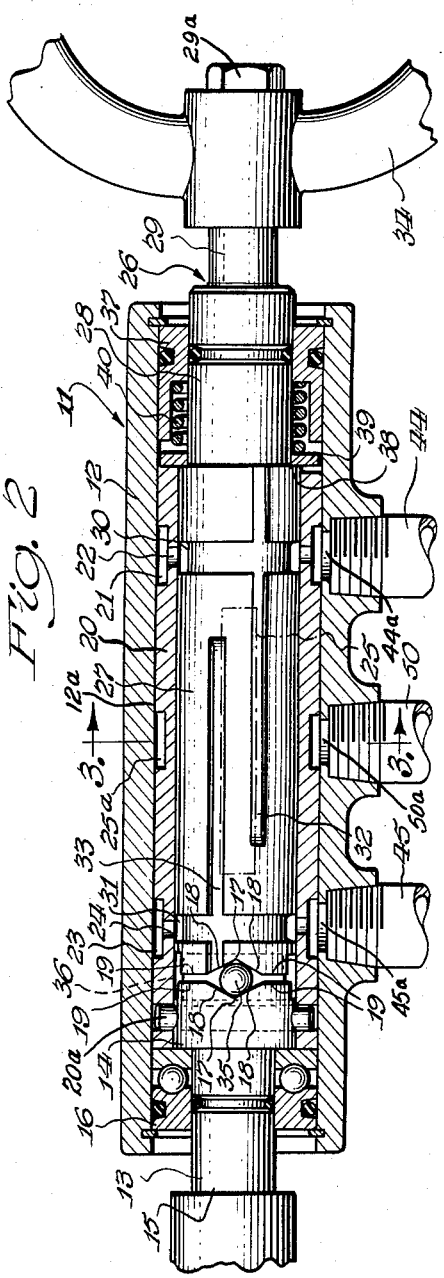
Inventor
Joseph F. Ziskal
Paul O. Pippel
Attorney Sept. 29, 1959 J. F. ZISKAL 2,906,361
MANUAL AND HYDRAULIC STEERING APPARATUS FOR VEHICLES
Filed Jan. 18, 1957 2 Sheets-Sheet 2
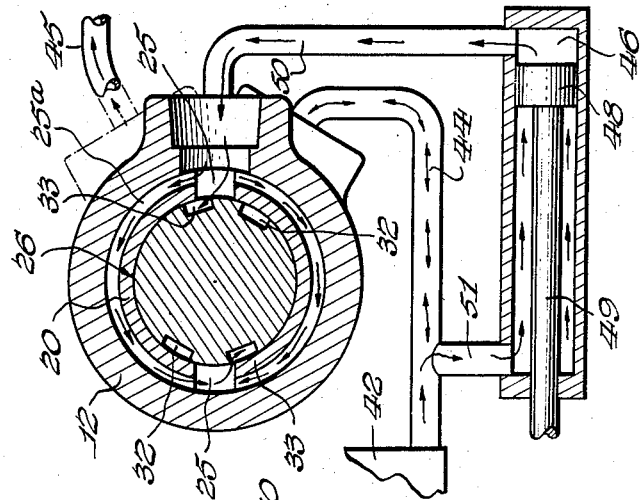
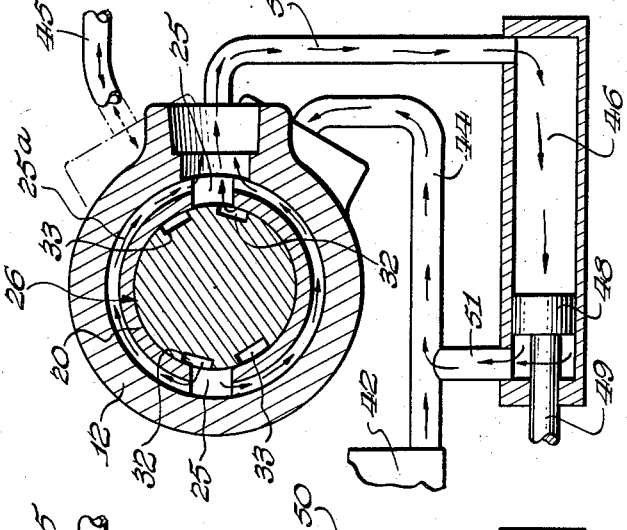
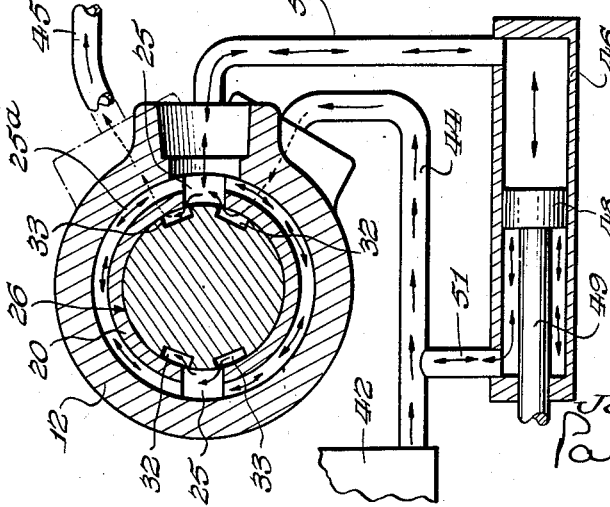
Inventor
Joseph F. Ziskal
Paul O. Pippel
Attorney United States Patent Office 2,906,361
Patented Sept. 29, 1959

2,906,361

MANUAL AND HYDRAULIC STEERING APPARATUS FOR VEHICLES

Joseph F. Ziskal, Brookfield, Ill., assignor to International Harvester Company, a corporation of New Jersey Application January 18, 1957, Serial No. 634,975

7 Claims. (Cl. 180—79.2)

This invention relates to steering apparatus for vehicles and is primarily concerned with a combined manual and hydraulic apparatus for steering vehicles.

An object of the invention is to provide the same speed of the vehicle wheels and the same thrust on the wheels when moving the wheels at an angle to the right or to the left of the longitudinal axis of the vehicle.

Another object of the invention is to provide a piston and piston rod and cylinder so arranged in a hydraulic control in a vehicle steering apparatus that the piston rod may be made as great in diameter as desired to prevent breaking of the piston rod.

The foregoing and other objects of the invention will be apparent from the construction and arrangement illustrated in the accompanying drawings wherein;

Figure 1 is a schematic view of the apparatus for steering the front wheels of a tractor, Figure 2 is a longitudinal sectional view through the operating mechanism of the steering apparatus, Figure 3 is a cross sectional view through the operating mechanism and a schematic view of several of the conduits and the piston and cylinder with the hydraulic system being shown in the neutral position, Figure 4 is a view identical to Figure 3 with the hydraulic system being shown when the piston rod is in a position outwardly of the cylinder, and Figure 5 is a view identical to Figure 3 with the hydraulic system being shown when the piston rod is in a position inwardly of the cylinder.

The invention proposes a combined manual and hydraulic steering apparatus for the front wheels of a vehicle. In tractors attachments are mounted on the front end and make the weight of the front end of the tractor so great that it is impossible to turn the wheels to the right or to the left by manual steering alone. The combined manual and hydraulic steering set forth herein makes possible the turning of the wheels. The combined manual and hydraulic steering apparatus of this invention provides the same speed of the vehicle wheels and the same thrust on the wheels when moving the wheels at an angle to the right or to the left of the longitudinal centerline of the vehicle.

In the drawings, 10 generally designates the front dirigible wheel means of a tractor. Apparatus is provided for steering the wheels manually with hydraulic controls to assist the manual steering and to lessen the effort required in steering. One of the principal components of the steering apparatus is the operating mechanism generally designated 11 which affects both the manual and hydraulic means for steering. The operating mechanism 11 is fixedly mounted on the tractor and is comprised of a valve housing 12 having both ends open and an element 13 having a head 14 and a shank 15. The head 14 and a portion of the shank 15 are positioned in the cylindrical bore 12a of the housing 12 and the remaining portion of the shank projects from one end of the housing. The shank 15 is rotatably mounted in packing 16 to rotatably mount the element 13 in the housing 12. The head 14 is provided with a recess 17 in its center and the recess is formed by cam means in the form of a pair of flat walls 18 arranged at an angle greater than ninety degrees with respect to each other and walls 19 at right angles to the axis of the element join the walls 18. A cylindrical valve sleeve 20 is rotatably positioned in the housing 12 and has one end disposed over and fixedly secured to the head 14 of the element. The outer periphery of sleeve 20 is in sliding sealing relation with the casing bore 12a. The sleeve 20 is provided with an inlet channel or groove 21 in its periphery extending completely around the sleeve and disposed adjacent one end of the sleeve, and an inlet passage in the form of an aperture 22 is provided in the bottom of the groove. The sleeve 20 is provided with an exhaust channel or groove 23 in its periphery extending completely around the sleeve and disposed adjacent the other end of the sleeve and spaced from the head 14 of the element, and an exhaust passage in the form of an aperture 24 is provided in the bottom of the groove. A third channel, 25a, extends circumferentially about the sleeve 20. The sleeve 20 is provided with a pair of opposed longitudinally extending slots or reversible flow passages 25 intermediate the ends thereof between the grooves 21 and 23. The channel 25a extending completely around the sleeve merges with the passages 25. A circular member 26 is rotatably positioned in the sleeve 20 and projects from the other end of the housing 12 and has a cylindrical section 27 constituting a valve core of predetermined diameter and a section 28 of lesser diameter than section 27 and a section 29 of lesser diameter than section 28. The valve core section 27 of the member has a circumferential inlet groove 30 extending completely therearound and this groove is disposed in communicative registry with the sleeve inlet passage 22. The valve core 27 also has a circumferential exhaust groove 31 which extends completely around such core and is spaced from groove 30 and is disposed in communicative registry with the exhaust passage 24. The valve core 27 has a pair of opposed longitudinally extending axial inlet grooves 32 beginning at a location intermediate the ends of the core and extending across the groove 30 to the adjacent end of the core. The core 27 also has a pair of opposed longitudinally extending axial exhaust grooves 33 beginning at a location intermediate the ends of the core and extending across the groove 31 to the other end of such core. The member 26 is provided with a recess 17 in such other end of the core 27 and having the same configuration of cam means 18 as the recess in the head of the element 13. A steering wheel 34 is fixedly secured on the projecting end of the member 26 to the section 29. The section 29 together with a cap screw 29a in the end thereof serve as means connecting the valve core 27 with the steering wheel 34. A free means in the form of two spaced balls 35 is disposed in the recesses 17 in the member 26 and the head 14 of the element and a plate 36 is disposed between the member and the element and separates the balls. The section 28 of the member is supported by packing 37 fixedly secured in the end of the housing 12. The joinder of the sections 27 and 28 of the member results in a shoulder 38 being formed on the member and a washer 39 is disposed on the section 28 and bears against the shoulder and resilient means in the form of a coil spring 40 is disposed on section 28 and bears against packing 37 and the washer to urge the member 26 against balls 35.

A reservoir 41 contains a liquid and a pump 42 is disposed adjacent the reservoir and a conduit 43 is in communication with the pump and the reservoir. A conduit 44 is in communication with the pump 42 and fits tightly in an inlet port 44a in the housing 12 of the operating mechanism so that it is in communication with the groove 21 in the sleeve. A conduit 45 is in communication with the reservoir 41 and fits tightly in an exhaust port 45a in the housing 12 of the operating mechanism so that it is in communication with the groove 23 of the sleeve. A cylinder 46 has one end pivotally mounted on the tractor by means of the universal joint 47. A piston 48 and piston rod 49 are disposed in the cylinder 46 and the piston rod projects from the other end of the cylinder. A conduit 50 fits tightly in a reversible flow port 50a in the housing 12 of the operating mechanism and is in communication with the groove 25a and the slots 25 in the sleeve and fits tightly in an opening in the cylinder 46 so that it is in communication with the interior of the cylinder between the piston 48 and the pivoted end of the cylinder. A conduit 51 is connected to the conduit 44 so as to be in communication therewith and fits tightly in an opening in the cylinder 46 so as to be in communication with the interior of the cylinder between the piston 48 and the other end of the cylinder. The cylinder 46 has a packing 52 fixed therein so as to prevent leakage around the piston rod and out of the cylinder. A conduit 53 is connected to the conduit 43 so as to be in communication therewith and fits tightly in an opening in the cylinder 46 opposite the packing 52 so that any leakage of liquid between the piston rod and the packing will move through an opening in the packing into the conduit 53. A vertical shaft 54 is operatively connected to the wheels 10. A rod 55 is made up of two sections connected together by a universal joint 56. One section of the rod is connected to the shank of the element 13 by a coupling 57 and a worm gear 58 is fixedly secured on the other section. A helical gear 59 is fixedly secured on the shaft 54 and meshes with the worm gear 58. An arm 60 is fixedly secured on the shaft 54 and a link 61 is pivotally connected to the piston rod 49 and is also pivotally connected to the arm.

The spring 40 serves to hold element 13, balls 35 and member 26 together when the tractor is not in operation. When the wheels 10 are in a position parallel to the longitudinal axis of the tractor liquid will flow through conduit 44, groove 21, aperture 22, grooves 30, slots 32, slots 25, slots 33, groove 31, aperture 24, groove 23 into conduit 45 and reservoir 41. In this position slots 25, groove 25a, and conduit 50 are in communication with each other so that liquid is in cylinder 46 on one side of the piston and conduit 51 is in communication with the cylinder so that there is liquid in the cylinder on the other side of the piston. In this position the liquid in conduits 50 and 51 and on opposite sides of the piston in the cylinder 46 is at low pressure since the pump 42 is discharging through open ports and conduits to the reservoir 41. This is called the neutral position of the hydraulic system and is shown in Figure 3. When the liquid flows through conduit 44 into the operating mechanism it will flow through slots 32 into the area between the packing 37 and the section 28 of the member 26.

When the steering wheel 34 is turned clockwise as viewed from the right in Figure 1 member 26 will be rotated clockwise a small angle and while rotating this small angle balls 35 will be wedged between walls 18 of recesses 17 so that upon the member being rotated through the small angle the balls will form a key between the member 26 and the element 13 so that the member and the element must rotate together. During this rotation of the member through the small angle the member will be moved backward compressing the spring 40. The limit of backward movement of member 26 will be reached when washer 39 comes into contact with packing 37. Upon the member 26 being keyed to the element 13 liquid will flow through conduit 44, groove 21, aperture 22, groove 30, slots 32, slots 25, groove 25a and conduit 50 into cylinder 46 to move the piston forwardly in the cylinder and continued rotation of the steering wheel 34 will turn rod 55 causing worm gear 58 to turn helical gear 59 and the gears and the cylinder 46 and piston 48 together will cause the wheels 10 to be moved to the right as shown in Figure 1. Flow of liquid from slots 25 to slots 33 is closed off as shown in Figure 4 and the liquid in conduit 45 will be in a static condition. This position is shown in Figure 4. But full pump pressure is imposed through conduit 51 onto the rod end of the piston 48 to oppose leftward movement of this piston by the effect of one half the area of the piston. This leaves one half the full area of the piston net for the full pressure on the head end thereof. Upon the operator releasing the steering wheel 34 the pressure of the liquid in the area of spring 40 and the force of such spring will cause member 26 to be rotated counterclockwise to the neutral position.

To rotate the wheels 10 to the left as viewed in Figure 1 the steering wheel 34 is turned counterclockwise as viewed in said figure until the member 26 is keyed to element 13. Liquid will flow through conduit 51 into cylinder 46 to move the piston backwardly in the cylinder. Liquid on the opposite side of the piston will be moved through conduit 50 through groove 25a, slots 25, slots 33, groove 31, aperture 24, groove 23 and conduit 45 into reservoir 41. Communication between slots 32 and slots 25 is closed off as shown in Figure 5 so that the liquid in conduit 44 will be in a static condition. Again only one-half the area of the full diameter piston is subjected to the full pressure of the pump because the cross-section of the piston rod is one-half the cross-sectional area of the piston, so the same hydraulic power supplements the manual steering effort as when turning to the right. This allows the piston rod to be made as great in diameter as desired by varying the piston diameter so that the area on the small end will be one half the area of the piston on the large end. In prior steering devices the piston rod diameter has been too small and the piston rods have been breaking. Thus it will be seen that in applicant's arrangement the piston rod will not be broken. Continued rotation of the steering wheel 34 will cause the gears 58 and 59 and the cylinder 46 and piston 48 to turn the wheels 10 to the left. This position is shown in Figure 5. Upon release of the steering wheel 34 by the operator the steering wheel will be moved by the pressure of the liquid in the area of spring 40 and the force of such spring to the neutral position. The balls 35 together with the cam profiles 18 and the member 37 which limits endwise displacement of the core 27 from the element 13 constitute means for limiting rotation of the core 27 relatively to the element 13.

What is claimed is:

1. Steering apparatus for a vehicle having dirigible wheel means and including an operating mechanism comprising a housing, an element positioned rotatively in the housing and projecting from one end thereof and operatively connected to the wheel means, a sleeve positioned in the housing and secured coaxially to the element for rotation therewith and provided with a first passageway and a second passageway spaced from the first passageway and from the element, said sleeve being further provided with a slot between but isolated from the first and second passageways, said sleeve being further provided with an outer peripheral groove extending circumferentially thereof and in communication with the slot, a circular member positioned rotatively in the sleeve and projecting from the other end of the housing and provided with a first longitudinally extending slot beginning at a location intermediate the ends of the member and extending to a location adjacent the first passageway in the sleeve and a second longitudinally extending slot beginning at a location intermediate the ends of the member and extending to a location adjacent the second passageway, said longitudinal slots having portions aligning circumferentially with portions of the sleeve slot to simultaneously communicate therewith while said member is in a neutral or centered position of rotational movement relatively to the sleeve, said longitudinal slots alternately remaining in communication with the sleeve slot attendant to the member being alternately rotated in oposite directions relatively to the sleeve from such neutral, a first groove extending circumferentially of and in the outer periphery of the member in communication with the first longitudinally extending slot and with the first passageway, a second groove extending circumferentially of and in the outer periphery of the member in communication with the second longitudinally extending slot and with the second passageway, free means disposed between the adjacent ends of the member and the element, cam means on the adjacent ends of the member and the element engaging the free means and cooperable with the free means to displace the member axially from the element attendant to rotation of the member in either direction from the neutral relatively to the sleeve, means limiting such axial displacement and thus cooperating with the free means and the cam means to cause rotation of the element with the member attendant to continued rotation of the member after it reaches either limit of such axial displacement, and a steering wheel fixedly secured on the projecting end of the member, a reservoir containing fluid and in communication with the second passageway of the sleeve of the operating mechanism, a pump in communication with the reservoir and in communication with the first passageway in the sleeve of the operating mechanism, a cylinder having one end pivotally mounted on the vehicle, a piston and piston rod disposed in the cylinder and the piston rod projecting from the other end of the cylinder and operatively connected to the wheels, the interior of the cylinder between the piston and said one end of the cylinder being in communication with the slot in the sleeve of the operating mechanism by way of the groove in such sleeve, and the interior of the cylinder between the piston and said other end of the cylinder being in communication with the pump.

2. Steering apparatus for a vehicle having dirigible wheel means including an operating mechanism comprising a housing and an element and a portion of the element being positioned rotatively in the housing and the remaining portion of the element projecting from one end of the housing, a sleeve positioned in the housing and secured to the element for rotation therewith and provided with a first passageway and a second passageway spaced from the first passageway and from the element, said sleeve being further provided with a slot between but isolated from the first and second passageways, a circular member positioned rotatively in the sleeve and projecting from the other end of the housing and provided with a first circumferential groove in its periphery in communication with the first passageway and provided with a second circumferential groove in its periphery in communication with the second passageway and provided with a first longitudinally extending slot beginning at a location between the first and second circumferential grooves and extending to the first circumferential groove and provided with a second longitudinally extending slot beginning at a location between the first and second circumferential grooves and extending to the second circumferential groove, said longitudinal slots having portions aligning circumferentially with portions of the sleeve slot to simultaneously communicate therewith while said member is in a neutral or central position of rotational movement relatively to the sleeve, said longitudinal slots alternately remaining in communication with the sleeve slot attendant to the member being alternately rotated in opposite directions from such neutral, free means disposed between the adjacent ends of the member and the element, cam means on the adjacent ends of the member and the element engaging the free means and cooperable with the free means to displace the member axially from the element attendant to rotation of the member in either direction from the neutral relatively to the sleeve, means limiting such axial displacement and thus cooperating with the free means and the cam means to cause rotation of the element with the member attendant to continued rotation of the member after it reaches either limit of such axial displacement, and a steering wheel fixedly secured on the projecting end of the member, a reservoir containing fluid and in communication with the second passageway of the sleeve of the operating mechanism, a pump in communication with the reservoir and in communication with the first passageway in the sleeve of the operating mechanism, a cylinder having one end pivotally mounted on the vehicle, a piston and piston rod disposed in the cylinder and the piston rod projecting from the other end of the cylinder, the interior of the cylinder between the piston and said one end of the cylinder being in communication with the slot in the sleeve of the operating mechanism, and the interior of the cylinder between the piston and said other end of the cylinder being in communication with the pump, a vertical shaft operatively connected to the dirigible wheel means, a rod having one end connected to the element, gears fixedly secured on the shaft and on the other end of the rod and meshing with each other, an arm fixedly secured to the shaft, and a link connected to the piston rod and to the arm.

3. Steering apparatus for a vehicle having dirigible wheel means including an operating mechanism comprising a housing and an element having a head and a shank and the head and a portion of the shank being positioned rotatively in the housing and the remaining portion of the shank projecting from one end of the housing, the head being provided with a recess in its center and the recess being formed by cam means with profiles in the form of a pair of flat walls, a sleeve positioned in the housing and secured to the head of the element for rotation therewith and provided with a first passageway adjacent one end and provided with a second passageway adjacent its other end and spaced from the head of the element, the sleeve being further provided with a longitudinally extending slot between but isolated from the first and second passageways, a circular member positioned rotatively in the sleeve and projecting from the other end of the housing and provided with a first circumferential groove in its periphery in communication with the first passageway and provided with a second circumferential groove in its periphery in communication with the second passageway and provided with a first longitudinally extending slot beginning at a location intermediate the circumferential grooves and extending to the first circumferential groove and a second longitudinally extending slot beginning at a location intermediate the circumferential grooves and extending to the second circumferential groove, said longitudinal slots having portions aligning circumferentially with portions of the sleeve slot to simultaneously communicate therewith while said member is in a neutral or central position of rotational movement relatively to the sleeve, said longitudinal slots alternately remaining in communication with the sleeve slot attendant to the member being alternately rotated in opposite directions from such neutral, said member being provided with a recess in said other end having the same configuration wtih cam means as the recess in the head of the element, a ball disposed in the recesses in the member and in the head of the element and cooperable with the cam means of such recesses to displace the member axially from the element attendant to rotation of the member in either direction from the neutral relatively to the sleeve, means limiting such axial displacement and thus cooperating with the ball and cam means to cause rotation of the element with the member attendant to continued rotation of the member after it reaches either limit of such axial displacement, a steering wheel fixed to the projecting end of said member, a reservoir containing fluid and in communication with the second passageway of the sleeve of the operating mechanism, a pump in communication with the reservoir and in communication wtih the first passageway in the sleeve of the operating mechanism, a cylinder having one end pivotally mounted on the vehicle, a piston and piston rod disposed in the cylinder and the piston rod projecting from the other end of the cylinder, the interior of the cylinder between the piston and said one end of the cylinder being in communication with the slot in the sleeve of the operating mechanism and the interior of the cylinder between the piston and said other end of the cylinder being in communication with the pump, a vertical shaft operatively connected to the dirigible wheel means, a rod having one end connected to the shank of the element, gears fixedly secured on the shaft and on the other end of the rod and meshing with each other, an arm fixedly secured to the shaft, and a link connected to the piston rod and to the arm.

4. Steering apparatus for a vehicle having dirigible wheel means including an operating mechanism comprising a housing and an element having a head and a shank and the head and a portion of the shank being positioned rotatively in the housing and the remaining portion of the shank projecting from one end of the housing, the head being provided with a recess in its center and the recess being formed by cam means with profiles in the form of a pair of flat walls, a sleeve positioned in the housing and secured to the head of the element for rotation therewith and provided with a first passageway adjacent one end and provided with a second passageway adjacent its other end and spaced from the head of the element, the sleeve being further provided with a longitudinally extending slot between but isolated from the first and second passageways, a circular member positioned rotatively in the sleeve and projecting from the other end of the housing and provided with a first circumferential groove in its periphery in communication with the first passageway and provided with a second circumferential groove in its periphery in communication with the second passageway and provided with a first longitudinally extending slot beginning at a location intermediate the circumferential grooves and extending to the first circumferential groove and a second longitudinally extending slot beginning at a location intermediate the circumferential grooves and extending to the second circumferential groove, said longitudinal slots having portions aligning circumferentially with portions of the sleeve slot to simultaneously communicate therewith while said member is in a neutral or central position of rotational movement relatively to the sleeve, said longitudinal slots alternately remaining in communication with the sleeve slot attendant to the member being alternately rotated in opposite directions from such neutral, said member being provided with a recess in said other end having the same configuration with cam means as the recess in the head of the element, a ball disposed in the recesses in the member and in the head of the element and cooperable with the cam means of such recesses to displace the member axially from the element attendant to rotation of the member in either direction from the neutral relatively to the sleeve, means limiting such axial displacement and thus cooperating with the ball and cam means to cause rotation of the element with the member attendant to continued rotation of the member after it reaches either limit of such axial displacement, a steering wheel fixed to the projecting end of said member, a reservoir containing fluid, a pump, a first conduit in communication with the pump and the reservoir, a second conduit in communication with the pump and the first passageway in the sleeve of the operating mechanism, a third conduit in communication with the reservoir and the second passageway in the sleeve of the operating mechanism, a cylinder having one end pivotally mounted on the vehicle, a piston and piston rod disposed in the cylinder and the piston rod projecting from the other end of the cylinder, a fourth conduit in communication with the slot in the sleeve of the operating mechanism and the interior of the cylinder between the piston and said one end of the cylinder, a fifth conduit in communication with the second conduit and the interior of the cylinder between the piston and said other end of the cylinder, a vertical shaft operatively connected to the dirigible wheel means, a rod having one end connected to the shank of the element, gears fixedly secured on the shaft and on the other end of the rod and meshing with each other, an arm fixedly secured to the shaft, and a link connected to the piston rod and to the arm.

5. Steering apparatus for a vehicle having dirigible wheel means including an operating mechanism comprising a housing and an element having a head and a shank and the head and a portion of the shank being positioned rotatively in the housing and the remaining portion of the shank projecting from one end of the housing, the head being provided with a recess in its center and the recess being formed by cam means with profiles in the form of a pair of flat walls, a sleeve positioned in the housing and secured to the head of the element for rotation therewith and provided with a groove in its outer periphery adjacent one end and provided with a first aperture in the bottom of the first groove and provided with a second groove in its outer periphery adjacent its other end and spaced from the head of the element and provided with a second aperture in the bottom of the second groove and provided with a longitudinally extending slot between and isolated from the first and second grooves, a circular member positioned rotatively in the sleeve and projecting from the other end of the housing and provided with a first circumferential groove in its periphery in communication with the first aperture and provided with a second circumferential groove in its periphery in communication with the second aperture and provided with a first longitudinally extending slot beginning at a location intermediate the circumferential grooves and extending to the first circumferential groove and a second longitudinally extending slot beginning at a location intermediate the circumferential grooves and extending to the second circumferential groove, said longitudinal slots having portions aligning circumferentially with portions of the sleeve slot to simultaneously communicate therewith while said member is in a neutral or central position of rotational movement relatively to the sleeve, said longitudinal slots alternately remaining in communication with the sleeve slot attendant to the member being alternately rotated in opposite directions from such neutral, said member being provided with a recess in said other end having the same configuration with cam means as the recess in the head of the element, a ball disposed in the recesses in the member and the head of the element and cooperable with the cam means of such recesses to displace the member axially from the element attendant to rotation of the member in either direction from the neutral relatively to the sleeve, means limiting such axial displacement and thus cooperating with the ball and cam means to cause rotation of the element with the member attendant to continued rotation of the member after it reaches either limit of such axial displacement, a steering wheel fixed to the projecting end of said member, a reservoir containing fluid, a pump, a first conduit in communication with the pump and the reservoir, a second conduit in communication with the pump and the first circumferential groove in the sleeve of the operating mechanism, a third conduit in communication with the reservoir and the second circumferential groove in the sleeve of the operating mechanism, a cylinder having one end pivotally mounted on the vehicle, a piston and piston rod disposed in the cylinder and the piston rod projecting from the other end of the cylinder, a fourth conduit in communication with the slot in the sleeve of the operating mechanism and the interior of the cylinder between the piston and said one end of the cylinder, a fifth conduit in communication with the second conduit and the interior of the cylinder between the piston and said other end of the cylinder, a vertical shaft operatively connected to the dirigible wheel means, a rod having one end connected to the shank of the element, a worm gear fixedly secured on the other end of the rod, a helical gear fixedly secured on the shaft and meshing with the worm gear, an arm fixedly secured to the shaft, and a link connected to the piston rod and to the arm.

6. In a hydraulic steering apparatus for a vehicle having a steering wheel and dirigible ground-engaging wheel means to be controlled responsive to rotation of such steering wheel; the combination of a valve housing containing a cylindrical bore, an inlet port communicating with the bore, an exhaust port communicating with the bore at a point spaced axially of such bore from the point of communication of the inlet port therewith, and a reversible flow port communicating with the bore between the points of communication of the inlet and exhaust ports therewith; a valve sleeve reversibly rotatable in such bore and having an outer cylindrical periphery in sliding sealing relation with such bore, the sleeve also having axially spaced circumferential channels within its outer periphery respectively communicatively registering with said ports, an inlet passage communicating radially through the sleeve in the bottom of one of such channels and through such one channel with the casing inlet port, an exhaust passage communicating radially through the sleeve in the bottom of a second of such channels and through such second channel with the casing exhaust port, and a reversible flow passage communicating radially through the sleeve in the bottom of a third of such channels and through such third channel with the casing reversible flow port, the reversible flow passage having opposite edges spaced apart circumferentially of the sleeve; a rotatable element connected between the dirigible wheels and the sleeve and operable when rotated with the sleeve in respectively opposite directions from an intermediate neutral position to maneuver the dirigible wheels for steering the vehicle in respectively opposite directions from a straight-ahead course; a valve core oppositely rotatable within the valve sleeve and having an outer cylindrical periphery in sliding sealing relation with the inner periphery of the sleeve, said core having a circumferential inlet groove in communicative registry with the sleeve inlet passage, a circumferential exhaust groove spaced axially of the core from the inlet groove and disposed in communicative registry with the sleeve exhaust passage, an axial inlet groove communicating with the circumferential inlet groove and extending therefrom axially of the core toward the circumferential exhaust groove, and an axial exhaust groove communicating with the circumferential exhaust groove and extending therefrom axially of the core toward the circumferential inlet groove, each of said axial grooves having an edge most proximate to the other of such axial grooves and spaced apart circumferentially of the core and sleeve somewhat less distantly than said opposite edges of the sleeve reversible flow passage to facilitate concurrent communicative registration of the axial grooves with the reversible flow passage while the core is in intermediate neutral position rotatively relatively to the sleeve; means connecting the valve core with the steering wheel to effect selective rotation of the core in either direction; means limiting rotation of the core relatively to said rotatable element which is connected with the dirigible wheels to cause said element and the sleeve to rotate in one direction with the core following rotation of the core sufficiently from neutral to have displaced the axial exhaust groove out of communication with the reversible flow passage while leaving the axial inlet groove in communication with the reversible flow passage and to cause said element and sleeve to rotate in the opposite direction with the core following rotation of the core sufficiently from neutral to have displaced the axial inlet groove out of communication with the reversible flow passage while leaving the axial exhaust groove in communication with the reversible flow passage; a hydraulic ram including a cylinder having a head end and a rod end, a piston in said cylinder, and a piston rod extending from the piston outwardly through the rod end of the cylinder; means connecting the cylinder with the vehicle; means operatively connecting the piston rod with the dirigible wheels to impart steering force thereto attendant to axial movement of the piston in the cylinder and compatible with that force transmittable to the dirigible wheels from the steering wheel through the valve core; a pump having an inlet and an outlet; conduit means connecting the pump inlet with the exhaust port of the valve housing; conduit means connecting the pump outlet with the rod end of the ram cylinder and with the inlet port of the valve housing; and conduit means connecting the reversible flow port of the valve housing with the head end of the ram cylinder.

7. In a hydraulic steering apparatus for a vehicle having a steering wheel and dirigible ground-engaging wheel means to be controlled responsively to rotation of such steering wheel, and such apparatus being adapted to use the force of fluid which has entered a pump through its inlet and is being forced from an outlet thereof to actuate a ram which includes a cylinder having a head end and containing a piston with a piston rod projecting outward through a rod end of the cylinder, and the piston rod and the cylinder being connected between a body portion of the vehicle and the dirigible wheel means to effect steering control thereof attendant to expansion or contraction of the ram; the combination of a valve housing adapted for support on the vehicle and containing a cylindrical bore, an inlet port leading to such bore, an exhaust port leading from such bore at a point spaced axially thereof from the inlet port, and a reversible flow port communicating with the bore at a point between the inlet and exhaust ports; a valve sleeve reversibly rotatable in such bore and having an outer cylindrical periphery in sliding sealing relation with the periphery of such bore, there being channels spaced apart axially of the sleeve and extending circumferentially thereabout, said channels being formed between the periphery of said bore and the outer periphery of the sleeve, one of said channels being an inlet channel in communicative registry with the inlet port, another of said channels being an exhaust channel in communicative registry with the exhaust port, a third of said channels being a reversible flow channel disposed between the inlet channel and the exhaust channel and in communicative registry with the reversible flow port, said sleeve containing an inlet passage extending radially therethrough from its inner periphery into communication with the inlet channel, said sleeve also containing an exhaust passage extending radially therethrough from its inner periphery into communication with the exhaust channel, said sleeve further containing a reversible flow passage extending radially therethrough from its inner periphery into communication with the reversible flow channel, such reversible flow passage having opposite edges spaced apart circumferentially of the sleeve, the sleeve being connectable with the dirigible wheel means to steer the same when rotated selectively oppositely; a valve core manually rotatable within the valve sleeve and having an outer cylindrical periphery in sliding sealing relation with the inner periphery of the sleeve, said core having a circumferential inlet groove in communicative registry with the sleeve inlet passage, a circumferential exhaust groove spaced axially of the core from the inlet groove and disposed in communicative registry with the sleeve exhaust passage, an axial inlet groove communicating with the circumferential inlet groove and extending therefrom axially of the core toward the circumferential exhaust groove, and an axial exhaust groove communicating with the circumferential exhaust groove and extending therefrom axially of the core toward the circumferential inlet groove, each of said axial grooves having an edge most proximate to the other of such axial grooves and spaced apart circumferentially of the core and sleeve somewhat less distantly than said opposite edges of the sleeve reversible passage to facilitate concurrent communicative registration of the axial grooves with the reversible flow passage while the core is in an intermediate neutral position rotatively relatively to the sleeve; and means limiting rotation of the core relatively to the sleeve to cause the sleeve to rotate in one direction with the core following rotation of the core sufficiently from neutral to have displaced the axial exhaust groove out of communication with the reversible flow passage while leaving the axial inlet groove in communication with the reversible flow passage and to cause said sleeve to rotate in the opposite direction with the core following rotation of the core sufficiently from the neutral to have displaced the axial inlet groove out of communication with the reversible flow passage while leaving the axial exhaust groove in communication with the reversible flow passage; said apparatus being operable to control the actuation of said ram when the casing exhaust port is communicative with the pump inlet, when the casing reversible flow port is communicative with the head end of the ram cylinder, and when the casing inlet port is communicative with the pump outlet and with the rod end of the ram cylinder.

References Cited in the file of this patent

UNITED STATES PATENTS

| | | |
|---|---|---|
| 2,213,271 | Davis | Sept. 3, 1940 |
| 2,369,324 | Thompson | Feb. 13, 1945 |
| 2,640,322 | Puerner | June 2, 1953 |